(12) United States Patent
Shinoda et al.

(10) Patent No.: US 9,273,179 B2
(45) Date of Patent: Mar. 1, 2016

(54) DECOMPOSABLE POLYMER

(71) Applicants: Masato Shinoda, Kanagawa (JP);
Toshiya Sagisaka, Kanagawa (JP)

(72) Inventors: Masato Shinoda, Kanagawa (JP);
Toshiya Sagisaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 109 days.

(21) Appl. No.: 14/134,483

(22) Filed: Dec. 19, 2013

(65) Prior Publication Data
US 2014/0194591 A1    Jul. 10, 2014

(30) Foreign Application Priority Data

Jan. 9, 2013   (JP) .................. 2013-001733
Mar. 11, 2013  (JP) .................. 2013-047570
Oct. 17, 2013  (JP) .................. 2013-216410

(51) Int. Cl.
| | | |
|---|---|---|
| *C08G 63/553* | (2006.01) | |
| *C08G 63/18* | (2006.01) | |
| *C08G 63/54* | (2006.01) | |
| *C08G 63/199* | (2006.01) | |
| *C08G 63/19* | (2006.01) | |
| *C08G 63/547* | (2006.01) | |

(52) U.S. Cl.
CPC .............. *C08G 63/553* (2013.01); *C08G 63/18* (2013.01); *C08G 63/19* (2013.01); *C08G 63/199* (2013.01); *C08G 63/54* (2013.01); *C08G 63/547* (2013.01)

(58) Field of Classification Search
CPC ...... C08G 63/18; C08G 63/199; C08G 63/54; C08G 63/553
See application file for complete search history.

(56) References Cited

U.S. PATENT DOCUMENTS

| | | |
|---|---|---|
| 7,166,689 B2 | 1/2007 | Sagisaka et al. |
| 8,440,713 B2 | 5/2013 | Goto et al. |
| 2007/0092760 A1 | 4/2007 | Sagisaka et al. |
| 2009/0069448 A1 | 3/2009 | Matsumoto |
| 2009/0230386 A1 | 9/2009 | Yamamoto et al. |
| 2010/0219405 A1 | 9/2010 | Sagisaka et al. |
| 2012/0119195 A1 | 5/2012 | Sagisaka et al. |
| 2012/0153271 A1 | 6/2012 | Goto et al. |

FOREIGN PATENT DOCUMENTS

| | | |
|---|---|---|
| JP | 63-288790 | 11/1988 |
| JP | 02-222411 | 9/1990 |
| JP | 06-041241 | 2/1994 |
| JP | 07-252306 | 10/1995 |
| JP | 2002-114921 | 4/2002 |
| JP | 2006-206650 | 8/2006 |
| JP | 4127682 | 5/2008 |
| JP | 4457183 | 2/2010 |
| JP | 2011-071501 | 4/2011 |
| JP | 4768993 | 6/2011 |
| JP | 2011-140580 | 7/2011 |
| JP | 2011-241273 | 12/2011 |
| WO | WO03/095523 A1 | 11/2003 |
| WO | WO2004/087791 | 10/2004 |
| WO | WO2006/121007 | 11/2006 |

*Primary Examiner* — Robert Jones, Jr.
(74) *Attorney, Agent, or Firm* — Cooper & Dunham LLP

(57) ABSTRACT

A decomposable polymer represented by General Formula (1):

General Formula (1)

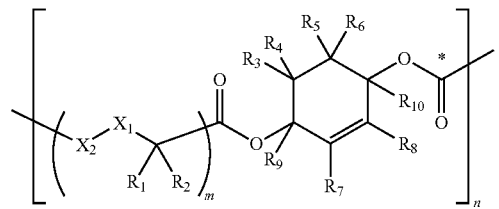

where $X_1$ denotes a certain group; $X_2$ denotes a certain group; $R_1$ and $R_2$ each independently denote a hydrogen atom, an alkyl group, an aromatic group, or an electron-withdrawing group; $R_3$ and $R_4$ each independently denote a hydrogen atom, an alkyl group, or an aromatic group, provide that $R_3$, $R_4$, or both are a hydrogen atom; $R_5$ and $R_6$ each independently denote a hydrogen atom, an alkyl group, or an aromatic group, provide that $R_5$, $R_6$, or both are a hydrogen atom; $R_7$ and $R_8$ each independently denote a hydrogen atom, an alkyl group, a halogen atom, or an aromatic group, provided that $R_7$ and $R_8$ may bond together to form a ring structure; $R_9$ and $R_{10}$ each independently denote a hydrogen atom, an alkyl group, or an aromatic group; n denotes a positive integer; and m denotes 0 or 1.

7 Claims, 5 Drawing Sheets

DECOMPOSABLE POLYMER

BACKGROUND OF THE INVENTION

1. Field of the Invention

The present invention relates to a decomposable polymer.

2. Description of the Related Art

Polymers have been widely utilized from the viewpoints of light weight, high durability, and moldability etc. However, in recent years, a large amount of polymer waste has been problematic.

For example, common polymers such as polystyrene, polyethylene, and polypropylene are required to be heated to 400° C. or more for pyrolysis.

Accordingly, biodegradable polymers have been got the attention. The biodegradable polymers are degraded into low molecular weight compounds and, finally, into carbon dioxide by soil microorganisms.

However, in order to degrade the biodegradable polymers, there is a problem that an environment which is required for the microorganisms to degrade the biodegradable polymers should be created. Additionally, the biodegradable polymers need a long time to be degraded, which is also problematic.

Accordingly, in order to degrade polymers in a short time, there has been proposed a polymer in which a thermally-decomposable group is introduced into its main chain.

For example, there has been proposed a decomposable polymer which is obtained by radical alternating copolymerization of diene monomers with oxygen and which has peroxide bonds in its main chain (see, for example, International Publication Nos. WO2004/087791 and WO2006/121007). In the decomposable polymers, the peroxide bonds are cleaved by heat treatment at a relatively low temperature.

However, the above described decomposable polymers are exothermically decomposed. Therefore, when the decomposable polymers are present in a large amount, there is a problem of a danger of explosion. Additionally, it is difficult to control a temperature during the heat treatment, which is also problematic.

On the other hand, a decomposable polymer having peroxide bonds starts to decompose in a low temperature range. With reference to TG-DTA (Thermo Gravimetric-Differential Thermal Analysis), the polymer is decreased in weight only by about 80% in a starting temperature range, that is, residues remain in an amount of about 20% by weight. It is believed that this is because radicals which are generated during cleavage of the peroxide bonds cause an unexpected reaction to thereby produce compounds which are not easily decomposed in a decomposition temperature range and which remain as the residues.

There also has been proposed a thermally-decomposable polymer which is obtained by polymerization of dibenzofulvenes under oxygen atmosphere (see, for example, Japanese Patent (JP-B) No. 4457183). This thermally-decomposable polymer has a structure in which peroxide bonds are present between some molecular dibenzofulvenes which are bound with each other because the thermally-decomposable polymer is allowed to react under the oxygen atmosphere.

However, also in this thermally-decomposable polymer, peroxide bonds undergo decomposition. Although the thermally-decomposable polymer is decreased in molecular weight due to the decomposition, oligomeric residues remain, which is problematic. Additionally, there is also a problem that radicals which are generated during the decomposition cause an unexpected reaction to thereby produce compounds which are not easily decomposed in a decomposition temperature range and which remain as the residues.

Therefore, at present, there is a need for a decomposable polymer which is decomposable at a low temperature in a short time and from which decomposed residue is hardly produced.

SUMMARY OF THE INVENTION

The present invention aims to solve the above existing problems and to achieve the following objects. That is, the present invention aims to provide a decomposable polymer which is decomposable at a low temperature in a short time and from which decomposed residue is hardly produced.

The means to solve the problems is as follows.

A decomposable polymer of the present invention is characterized by being represented by the following General Formula (1).

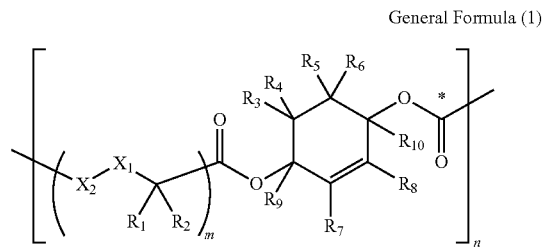

General Formula (1)

In the General Formula (1), $X_1$ denotes a group represented by the following General Formula (2); $X_2$ denotes a group represented by the following General Formula (3); $R_1$ and $R_2$ each independently denote a hydrogen atom, an alkyl group, an aromatic group, or an electron-withdrawing group; $R_3$ and $R_4$ each independently denote a hydrogen atom, an alkyl group, or an aromatic group, provide that $R_3$, $R_4$, or both thereof are a hydrogen atom; $R_5$ and $R_6$ each independently denote a hydrogen atom, an alkyl group, or an aromatic group, provide that $R_5$, $R_6$, or both thereof are a hydrogen atom; $R_7$ and $R_8$ each independently denote a hydrogen atom, a halogen atom, an alkyl group, or an aromatic group, provided that $R_7$ and $R_8$ may bond together to form a ring structure; $R_9$ and $R_{10}$ each independently denote a hydrogen atom, an alkyl group, or an aromatic group; n denotes a positive integer; and m denotes 0 or 1.

General Formula (2)

In the General Formula (2), $Y_1$ denotes an oxygen atom or a sulfur atom.

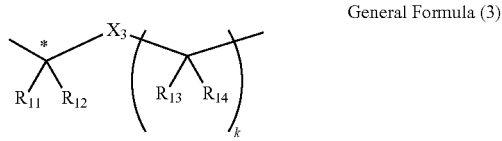

General Formula (3)

In the General Formula (3), $R_{11}$ and $R_{12}$ each independently denote a hydrogen atom, an alkyl group, an aromatic group, or an electron-withdrawing group; $R_{13}$ and $R_{14}$ each independently denote a hydrogen atom, an alkyl group, or an aromatic group; $X_3$ denotes a single bond or a group represented by the following General Formula (4); k denotes 0 or a positive integer, provided that when $X_3$ is the single bond, k is 0; and a carbon atom indicated by a symbol * binds to a carbon atom of a carbonyl group indicated by a symbol * in the General Formula (1).

General Formula (4)

In the General Formula (4), $Y_2$ denotes an oxygen atom or a sulfur atom.

The present invention can solve the above existing problems and can provide a decomposable polymer which is decomposable at a low temperature in a short time and from which decomposed residue is hardly produced.

Figure 1:
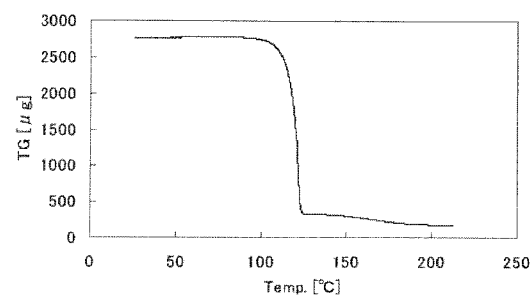
FIG. 1 shows a graph representing a measurement result of a thermal analysis of acetonedicarboxylic acid.

DETAILED DESCRIPTION OF THE INVENTION (Decomposable Polymer)
A decomposable polymer of the present invention is represented by the following General Formula (1).

General Formula (1)

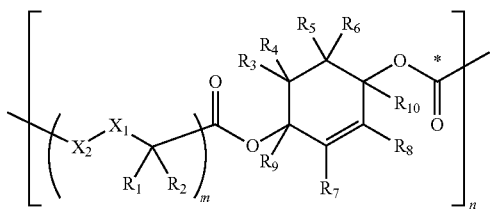

In the General Formula (1), $X_1$ denotes a group represented by the following General Formula (2); $X_2$ denotes a group represented by the following General Formula (3); $R_1$ and $R_2$ each independently denote a hydrogen atom, an alkyl group, an aromatic group, or an electron-withdrawing group; $R_3$ and $R_4$ each independently denote a hydrogen atom, an alkyl group, or an aromatic group, provide that $R_3$, $R_4$, or both thereof are a hydrogen atom; $R_5$ and $R_6$ each independently denote a hydrogen atom, an alkyl group, or an aromatic group, provide that $R_5$, $R_6$, or both thereof are a hydrogen atom; $R_7$ and $R_8$ each independently denote a hydrogen atom, a halogen atom, an alkyl group, or an aromatic group, provided that $R_7$ and $R_8$ may bond together to form a ring structure; $R_9$ and $R_{10}$ each independently denote a hydrogen atom, an alkyl group, or an aromatic group; n denotes a positive integer; and m denotes 0 or 1.

General Formula (2)

In the General Formula $Y_1$ denotes an oxygen atom or a sulfur atom.

General Formula (3)

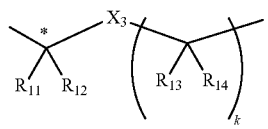

In the General Formula (3), $R_{11}$ and $R_{12}$ each independently denote a hydrogen atom, an alkyl group, an aromatic group, or an electron-withdrawing group; $R_{13}$ and $R_{14}$ each independently denote a hydrogen atom, an alkyl group, or an aromatic group; $X_3$ denotes a single bond or a group represented by the following General Formula (4); k denotes 0 or a positive integer, provided that when $X_3$ is the single bond, k is 0; and a carbon atom indicated by a symbol * binds to a carbon atom of a carbonyl group indicated by a symbol * in the General Formula (1).

General Formula (4)

In the General Formula (4), $Y_2$ denotes an oxygen atom or a sulfur atom.

In the General Formula (1), the group represented by the General Formula (3) is preferably a group represented by the following General Formula (5).

General Formula (5)

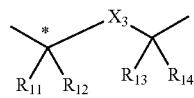

In the General Formula (5), $R_{11}$ and $R_{12}$ each independently denote a hydrogen atom, an alkyl group, an aromatic group, or an electron-withdrawing group; $R_{13}$ and $R_{14}$ each independently denote a hydrogen atom, an alkyl group, or an aromatic group; $X_3$ denotes a group represented by the following General Formula (6); and a carbon atom indicated by a symbol * binds to a carbon atom of a carbonyl group indicated by a symbol * in the General Formula (1).

General Formula (6)

In the General Formula (6), $Y_2$ denotes an oxygen atom or a sulfur atom.

The decomposable polymer is preferably represented by the following General Formula (7).

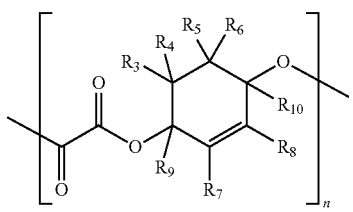

General Formula (7)

In the General Formula (7), $R_3$ and $R_4$ each independently denote a hydrogen atom, an alkyl group, or an aromatic group, provide that $R_3$, $R_4$, or both thereof are a hydrogen atom; $R_5$ and $R_6$ each independently denote a hydrogen atom, an alkyl group, or an aromatic group, provide that $R_5$, $R_6$, or both thereof are a hydrogen atom; $R_7$ and $R_8$ each independently denote a hydrogen atom, a halogen atom, an alkyl group, or an aromatic group, provided that $R_7$ and $R_8$ may bond together to form a ring structure; $R_9$ and $R_{10}$ each independently denote a hydrogen atom, an alkyl group, or an aromatic group; and n denotes a positive integer.

The decomposable polymer is preferably represented by the following General Formula (8).

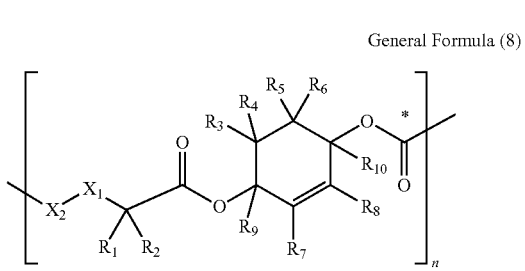

General Formula (8)

In the General Formula (8), $X_1$ denotes a group represented by the following General Formula (9); $X_2$ denotes a group represented by the following General Formula (10); $R_1$ and $R_2$ each independently denote a hydrogen atom, an alkyl group, an aromatic group, or an electron-withdrawing group; $R_3$ and $R_4$ each independently denote a hydrogen atom, an alkyl group, or an aromatic group, provide that $R_3$, $R_4$, or both thereof are a hydrogen atom; $R_5$ and $R_6$ each independently denote a hydrogen atom, an alkyl group, or an aromatic group, provide that $R_5$, $R_6$, or both thereof are a hydrogen atom; $R_7$ and $R_8$ each independently denote a hydrogen atom, a halogen atom, an alkyl group, or an aromatic group, provided that $R_7$ and $R_8$ may bond together to form a ring structure; $R_9$ and $R_{10}$ each independently denote a hydrogen atom, an alkyl group, or an aromatic group; and n denotes a positive integer.

General Formula (9)

In the General Formula (9), $Y_1$ denotes an oxygen atom or a sulfur atom.

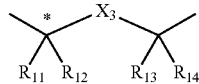

General Formula (10)

In the General Formula (10), $R_{11}$ and $R_{12}$ each independently denote a hydrogen atom, an alkyl group, an aromatic group, or an electron-withdrawing group; $R_{13}$ and $R_{14}$ each independently denote a hydrogen atom, an alkyl group, or an aromatic group; $X_3$ denotes a group represented by the following General Formula (11); and a carbon atom indicated by a symbol * binds to a carbon atom of a carbonyl group indicated by a symbol * in the General Formula (8).

General Formula (11)

In the General Formula (11), $Y_2$ denotes an oxygen atom or a sulfur atom.

In the decomposable polymer, it is believed that an ester moiety in its main chain forms a six-membered ring in a transition state according to the following reaction formula by external stimulation, and then a hydrogen atom bound to a β-carbon is 1,5-transferred to a carbonyl oxygen. At the same time, bonds are rearranged to thereby cleave a bond between an ether oxygen in an ester bond and a carbon at an α-position, which converts the decomposable polymer into a small molecule to thereby allow decomposition reaction to proceed.

Therefore, in a repeating unit represented by the General Formula (1), $R_3$, $R_4$, or both thereof should be a hydrogen atom. Additionally, $R_5$, $R_6$, or both thereof should be a hydrogen atom.

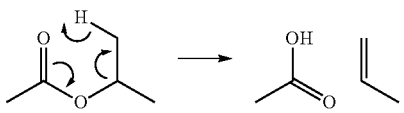

By introducing an electron-withdrawing group into an α- and/or β-position of a carbonyl carbon, the decomposition reaction represented by the above formula may be allowed to proceed at a lower temperature than a structure into which an electron-withdrawing group is not introduced. It is believed that this is because the electron-withdrawing group withdraws an electron in the carbonyl carbon, so that the number of the electron in a carbonyl oxygen is increased to thereby promote the above decomposition reaction.

Accordingly, examples of an electron-withdrawing group in $R_1$ and $R_2$ in the General Formula (1) and the General Formula (8), or an electron-withdrawing group in $R_{11}$ and $R_{12}$ in the General Formula (3), the General Formula (5) and the General Formula (10) includes a nitro group, a p-toluenesulfonyl group, a trifluoromethylsulfonyl group, a trifluoromethyl group, a phosphate group, a cyano group, and a halogen atom. Examples of the halogen atom include a chlorine atom and a fluorine atom.

Examples of $Y_1$ in the General Formula (2) and the General Formula (9), and $Y_2$ in the General Formula (4), the General Formula (6), and the General Formula (11) include an oxygen atom and a sulfur atom. The $Y_1$ or the $Y_2$ is preferably an oxygen atom.

By producing conjugated compounds or aromatic compounds through decomposition reaction according to the following reaction formula, it is possible to generally decrease activation energy of the decomposition reaction accompanied by a decrease of production energy due to a resonance effect, which permits the decomposition reaction to occur at a lower temperature.

As used herein, "low temperature" means, for example, 80° C. to 200° C.

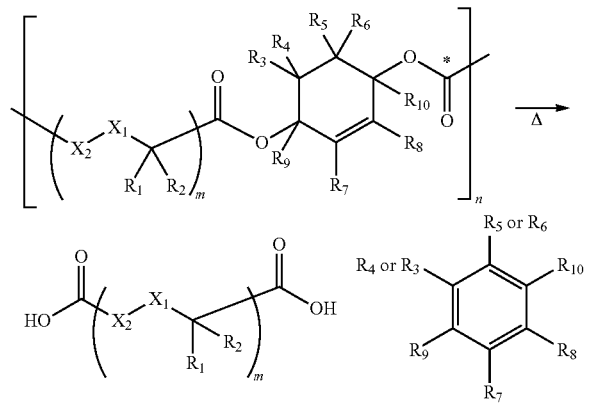

Examples of the aromatic compound which permits the decomposition reaction to occur at a lower temperature include acenes such as naphthalene, anthracene, tetracene, and pentacene; benzene, indene, phenanthrene, chrysene, azulene, and pyrene.

Therefore, the $R_7$ and $R_8$ each independently denote a hydrogen atom, a halogen atom, an alkyl group, or an aromatic group. The $R_7$ and $R_8$ may bond together to form a ring structure. The $R_7$ and $R_8$ preferably bond together to form a benzene ring because activation energy of the decomposition reaction is decreased accompanied by a decrease of production energy due to a resonance effect, which permits the decomposition reaction to occur at a lower temperature.

It is preferred that the decomposable polymer is decomposed into a first decomposed product through application of heat energy, and, in turn, the first decomposed product is decomposed into a second decomposed product through application of heat energy.

The first decomposed product is preferably a dicarboxylic acid compound which is produced by cleaving a bond between an ether oxygen in an ester bond and a carbon atom at an α-position in the ether oxygen.

The second decomposed product is preferably a compound which is produced through decarboxylation of the dicarboxylic acid compound.

The application of heat energy is preferably heating.

A temperature during the heating is not particularly limited and may be appropriately selected depending on the intended purpose. It is preferably 100° C. to 200° C.

The decomposable polymer is preferably decomposed into a to dicarboxylic acid compound and a conjugated compound through application of heat energy. Additionally, the dicarboxylic acid compound is preferably decarboxylated through application of heat energy.

In the General Formula (1), when m=0, the dicarboxylic acid compound produced by a first decomposition reaction is oxalic acid, which, in turn, is decomposed into carbon dioxide and hydrogen by a second decomposition reaction to thereby vaporize.

In the General Formula (1), when m=1, introduction of a carbonyl group or a thionyl group into a β-position of an ester bond moiety in which the decomposition reaction proceeds causes additional decomposition of the dicarboxylic acid compound obtained by the decomposition reaction. The reaction is a decarboxylation reaction at a carboxylic acid moiety of the dicarboxylic acid compound. Thus, the dicarboxylic acid compound is further decomposed into a low molecular weight compound and carbon dioxide. Polar carboxylic acid moiety is eliminated due to decarboxylation, which significantly decreases the boiling point of the low molecular weight compound.

For example, acetonedicarboxylic acid contains a carbonyl group serving as an electron-withdrawing group at a β-position of carboxylic acid. FIG. 1 shows a measurement result of a thermal analysis of the acetonedicarboxylic acid. It can be confirmed that acetonedicarboxylic acid is decomposed at about 110° C. In this decomposition process, acetonedicarboxylic acid is decomposed into carbon dioxide and acetone.

Glutaric acid has the boiling point of 302° C. which does not have an electron-withdrawing group (carbonyl group) at a β-position of acetonedicarboxylic acid. Therefore, when a decomposable polymer containing glutaric acid in its structural unit is decomposed at a low temperature, decomposed residue may remain because the electron-withdrawing group is not present at the β-position.

An alkyl group of $R_1$, $R_2$, $R_3$, $R_4$, $R_5$, $R_6$, $R_7$, $R_8$, $R_9$, and $R_{10}$ in the General Formula (1) and the General Formula (8); $R_3$, $R_4$, $R_5$, $R_6$, $R_7$, $R_8$, $R_9$, and $R_{10}$ in the General Formula (7); and $R_{11}$, $R_{12}$, $R_{13}$ and $R_{14}$ in the General Formula (3), the General Formula (5) and the General Formula (10) is not particularly limited and may be appropriately selected depending on the intended purpose. It is preferably a C1 to C6 alkyl group, more preferably a methyl group or an ethyl group.

An aromatic group of $R_1$, $R_2$, $R_3$, $R_4$, $R_5$, $R_6$, $R_7$, $R_8$, $R_9$, and $R_{10}$ in the General Formula (1) and the General Formula (8); $R_3$, $R_4$, $R_5$, $R_6$, $R_7$, $R_8$, $R_9$, and $R_{10}$ in the General Formula (7); and $R_{11}$, $R_{12}$, $R_{13}$ and $R_{14}$ in the General Formula (3), the General Formula (5) and the General Formula (10) is not particularly limited and may be appropriately selected depending on the intended purpose. It is preferably a C6 to C10 aromatic group, more preferably a phenyl group, a tolyl group, a xylyl group, or a naphthyl group.

Examples of the halogen atom of $R_7$ and $R_8$ in the General Formula (1), the General Formula (7), and the General Formula (8) include a fluorine atom, a chlorine atom, a bromine atom, or an iodine atom.

Also, n in the General Formula (1), the General Formula (7), and the General Formula (8) is not particularly limited and may be appropriately selected depending on the intended purpose. It is preferably 30 to 200, more preferably 30 to 70.

Also, k in the General Formula (3) is not particularly limited and may be appropriately selected depending on the intended purpose. It is preferably 0 to 10, more preferably 0 to 5.

A molecular weight of the decomposable polymer is not particularly limited and may be appropriately selected depending on the intended purpose. It is preferably 10,000 to 300,000, more preferably 10,000 to 20,000 in terms of a weight average molecular weight.

Example of the decomposable polymer represented by the General Formula (1) includes a decomposable polymer represented by the following General Formula (1-1) when m is 0, or a decomposable polymer represented by the following General Formula (1-2) when m is 1.

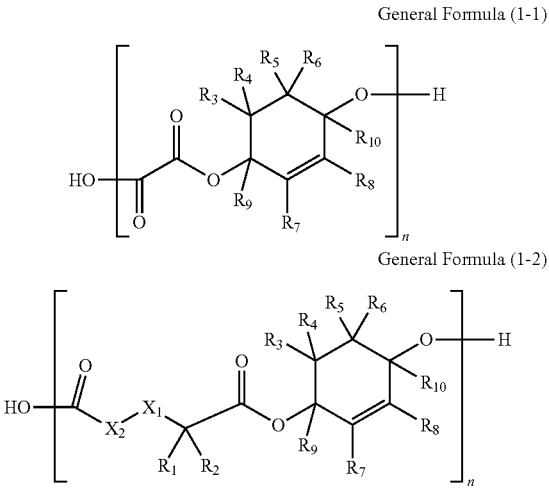

General Formula (1-1)

General Formula (1-2)

In the General Formula (1-1), $X_1$, $X_2$, $R_3$, $R_4$, $R_5$, $R_6$, $R_7$, $R_8$, $R_9$, $R_{10}$, and n denote the same as $X_1$, $X_2$, $R_3$, $R_4$, $R_5$, $R_6$, $R_7$, $R_8$, $R_9$, $R_{10}$, and n in the General Formula (1), respectively.

In the General Formula (1-2), $X_1$, $X_2$, $R_1$, $R_2$, $R_3$, $R_4$, $R_5$, $R_6$, $R_7$, $R_8$, $R_9$, $R_{10}$, and n denote the same as $X_1$, $X_2$, $R_1$, $R_2$, $R_3$, $R_4$, $R_5$, $R_6$, $R_7$, $R_8$, $R_9$, $R_{10}$, and n in the General Formula (1), respectively.

A method for synthesizing the decomposable polymer is not particularly limited and may be appropriately selected depending on the intended purpose. The decomposable polymer contains an ester bond in its main chain, so that can be synthesized in the same manner as polyester.

For example, the decomposable polymer can be synthesized through the following reactions: a direct esterification reaction of diols with dicarboxylic acids, a reaction of diols with diacid halides, a reaction of dihalides with dicarboxylic acids, a reaction of acid anhydrides with glycols, a reaction of glycols with diketenes, a Tischtschenko reaction, a reaction of ketenes, a copolymerization reaction of dimethylketenes with aldehydes or ketones, a ring-opening polymerization reaction of diketenes, a ring-opening polymerization reaction of cyclic esters, a ring-opening polymerization reaction of acetals, a copolymerization reaction of cyclic ethers with acid anhydrides, a reaction of dibasic acids with ethylene carbonates, a reaction of cyclic ethers with carbon oxides, a reaction of divinyl ethers with dicarboxylic acids, a reaction of carbonates or sulfites, and a reaction of aliphatic dibasic acids with alkylenebischlorformates.

A method for synthesizing the decomposable polymer is not particularly limited and may be appropriately selected depending on the intended purpose, provided that a reaction proceeds in a temperature range in which the resultant decomposable polymer is not decomposed.

The decomposable polymer can be obtained by allowing to react a compound represented by the following General Formula (12) with a compound represented by the following General Formula (11-1) (when m=0) or a compound represented by the following General Formula (11-2) (when m=1).

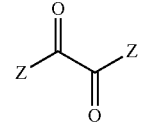

General Formula (11-1)

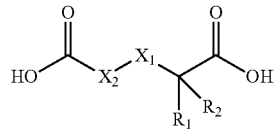

General Formula (11-2)

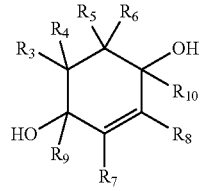

General Formula (12)

In the General Formula (11-1), Z denotes a hydroxyl group or a halogen atom. In the General Formula (11-2), $X_1$, $X_2$, $R_1$, and $R_2$ denote the same as $X_1$, $X_2$, $R_1$ and $R_2$ in the General Formula (1), respectively.

In the General Formula (12), $R_3$, $R_4$, $R_5$, $R_6$, $R_7$, $R_8$, $R_9$ and $R_{10}$ denote the same as $R_3$, $R_4$, $R_5$, $R_6$, $R_7$, $R_8$, $R_9$ and $R_{10}$ in the General Formula (1).

Examples of the halogen atom in the Z include a chlorine atom and a bromine atom.

EXAMPLES

The present invention now will be described with reference to Examples, but is not limited thereto.

Example 1

Figure 2:
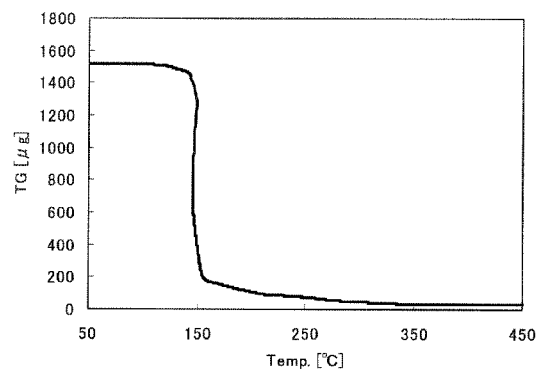
FIG. 2 shows a TG-DTA measurement result of a decomposable polymer of Example 1.

A 50 mL 3-necked flask was charged with tetralin diol (1.00 g, 6.09 mmol) and was replaced with argon. Thereafter, THF (16 mL) and pyridine (1 mL) was added thereto, followed by cooling to −78° C. To the resultant solution, oxalyl chloride (0.52 mL, 6.09 mmol) was added dropwise, followed by stirring for 12 hours while gradually allowing to warm to room temperature. The resultant reaction solution was added dropwise to water to thereby precipitate a polymer. The resultant polymer was filtered off, purified by reprecipitating with THF/methanol, and subjected to vacuum drying to thereby obtain 1.09 g of a colorless polymer (yield: 82%). The polymer was found to have a weight average molecular weight of 22,000 in terms of polystyrene as measured by GPC. The resultant polymer was subjected to a TG-DTA measurement to thereby confirm its decomposition temperature. The result is shown in FIG. 2.

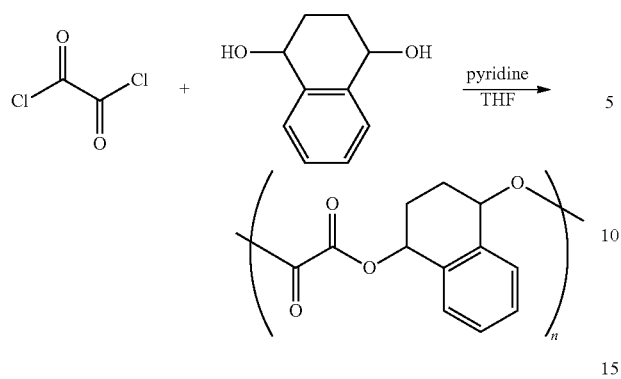

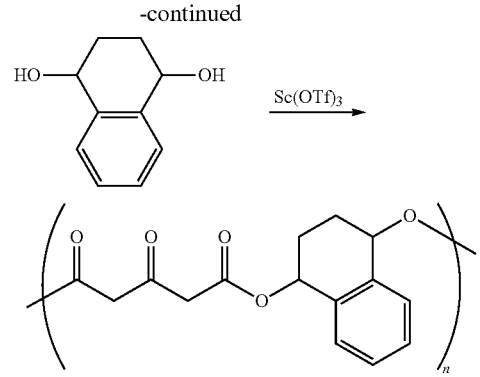

Example 2

Comparative Example 1

Figure 3:
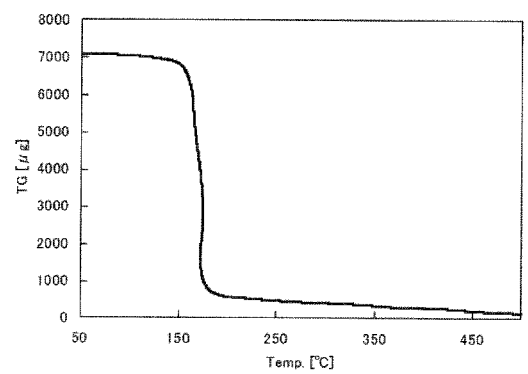
FIG. 3 shows a TG-DTA measurement result of a decomposable polymer of Example 2.

A 50 mL 3-necked flask was charged with bromocyclohexenediol (0.499 g, 2.58 mmol) and was replaced with argon. Thereafter, THF (5 mL) and pyridine (0.25 mL) was added thereto, followed by cooling to −78° C. To the resultant solution, a solution of oxalyl chloride (0.328 g, 2.58 mmol) in THF (2 mL) was added dropwise, followed by stirring for 12 hours while gradually allowing to warm to room temperature. The resultant reaction solution was added dropwise to water. The resultant precipitate was collected to thereby obtain a colorless polymer (yield: 75%). The resultant polymer was subjected to a TG-DTA measurement to thereby confirm its decomposition temperature. The result is shown in FIG. 3.

Figure 5:
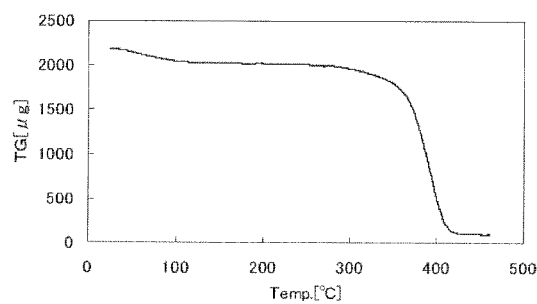
FIG. 5 shows a TG-DTA measurement result of a decomposable polymer of Comparative Example 1.

A 50 mL 3-necked flask which had been purged with argon flow was charged with THF (tetrahydrofuran, 10 mL), pyridine (10 mL), 1,3-propanediol (0.95 mL, $1.31 \times 10^{-2}$ mol, 1.0 eq), and 4-dimethylaminopyridine (DMAP, 0.32 g, $2.63 \times 10^{-3}$ mol, 0.2 eq), and stirred. The flask was cooled to 0° C. in an ice bath, charged with glutaryl chloride (1.70 mL, $1.31 \times 10^{-2}$ mol, 1.0 eq), followed by stirring at 0° C. for 1 hour. Thereafter, the ice bath was removed, followed by stirring at room temperature for 1 hour. The resultant reaction solution was poured into water, and the resultant precipitate was collected. The precipitate was purified by reprecipitating with chloroform/hexane. The resultant polymer was subjected to a TG-DTA measurement to thereby confirm its decomposition temperature. The result is shown in FIG. 5.

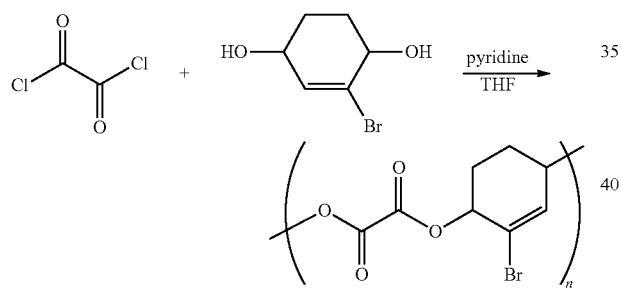

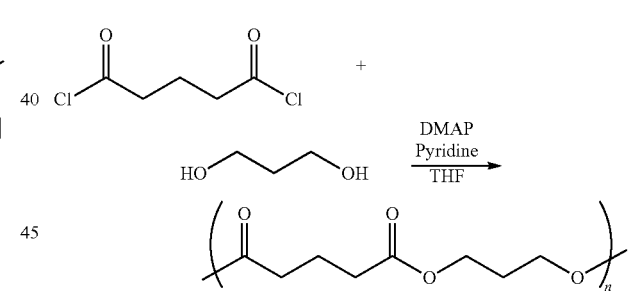

Example 3

Comparative Example 2

Figure 4:
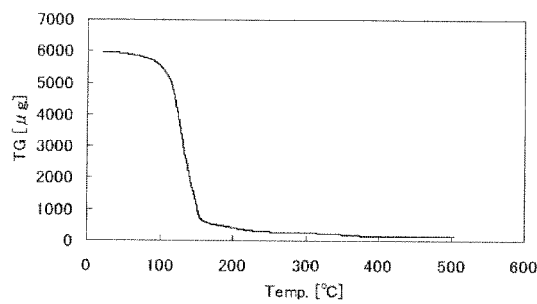
FIG. 4 shows a TG-DTA measurement result of a decomposable polymer of Example 3.

A 25 mL 3-necked flask which had been purged with argon flow was charged with acetonitrile (8 mL), acetonedicarboxylic acid (1.00 g, $6.84 \times 10^{-3}$ mol, 1.0 eq), 1,2,3,4-tetrahydronaphthalene-1,4-diol (1.13 g, $6.84 \times 10^{-3}$) mol, 1.0 eq), and scandium (III) trifluoromethanesulfonate (Sc(OTf)$_3$, 0.067 g, $1.37 \times 10^{-4}$ mol, 0.02 eq), and stirred at 40° C. for 2 hours. A vacuum pump was connected to the flask to thereby distill off acetonitrile. The resultant was stirred under a reduced pressure at 65° C. for 33 hours, and then purified by reprecipitating with methanol/water. The resultant polymer was subjected to a TG-DTA measurement to thereby confirm its decomposition temperature. The result is shown in FIG. 4.

Figure 6:
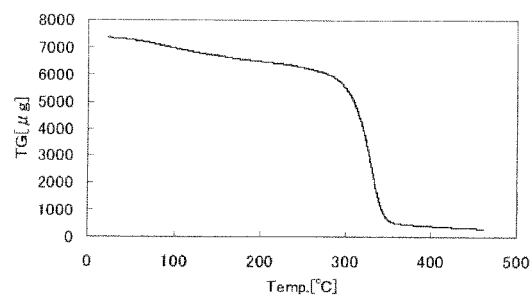
FIG. 6 shows a TG-DTA measurement result of a decomposable polymer of Comparative Example 2.

A 50 mL 3-necked flask which had been purged with argon flow was charged with THF (10 mL), pyridine (10 mL), 2,4-pentanediol (1.04 mL, $9.60 \times 10^{-3}$ mol, 1.0 eq), and 4-dimethylaminopyridine (0.234 g, $1.92 \times 10^{-3}$ mol, 0.2 eq), and stirred. The flask was cooled to 0° C. in an ice bath, charged with glutaryl chloride (1.24 mL, $9.60 \times 10^{-3}$ mol, 1.0 eq), followed by stirring at 0° C. for 1 hour. Thereafter, the ice bath was removed, followed by stirring at room temperature for 1 hour. The resultant reaction solution was poured into water, and the resultant precipitate was collected. The precipitate was purified by reprecipitating with chloroform/hexane. The resultant polymer was subjected to a TG-DTA measurement to thereby confirm its decomposition temperature. The result is shown in FIG. 6.

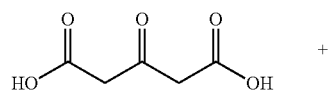

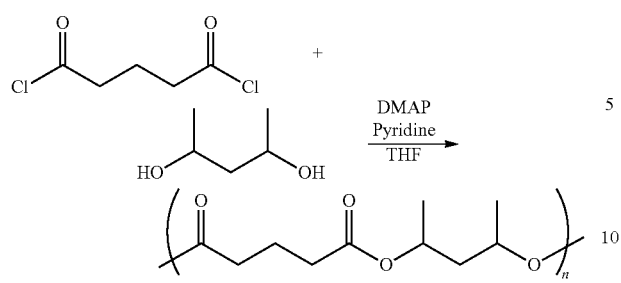

Comparative Example 3

Figure 7:
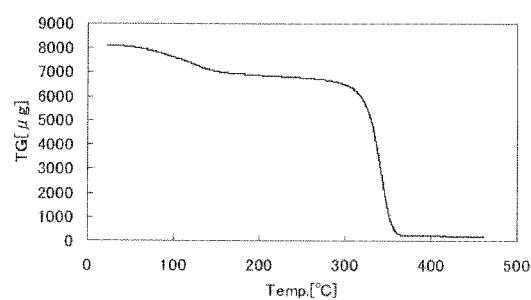
FIG. 7 shows a TG-DTA measurement result of a decomposable polymer of Comparative Example 3.

A 50 mL 3-necked flask which had been purged with argon flow was charged with THF (10 mL), pyridine (10 mL), 1,3-cyclohexanediol (1.00 g, 8.61×10$^3$ mol, 1.0 eq), and 4-dimethylaminopyridine (0.21 g, 1.72×10$^{-3}$ mol, 0.2 eq), and stirred. The flask was cooled to 0° C. in an ice bath, charged with glutaryl chloride (1.11 mL, 8.61×10$^3$ mol, 1.0 eq), followed by stirring at 0° C. for 1 hour. Thereafter, the ice bath was removed, followed by stirring at room temperature for 1 hour. The resultant reaction solution was poured into water, and the resultant precipitate was collected. The precipitate was purified by reprecipitating with chloroform/hexane. The resultant polymer was subjected to a TG-DTA measurement to thereby confirm its decomposition temperature. The result is shown in FIG. 7.

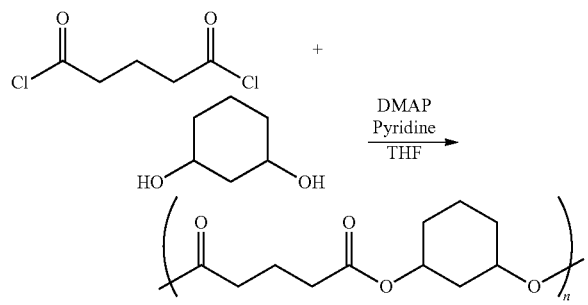

Comparative Example 4

Figure 8:
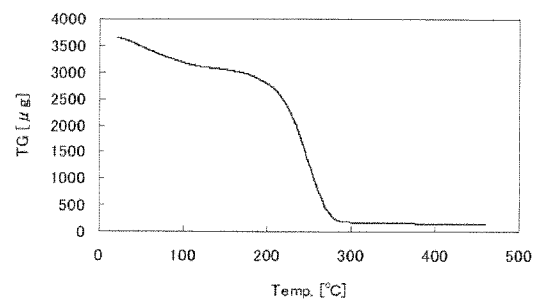
FIG. 8 shows a TG-DTA measurement result of a decomposable polymer of Comparative Example 4.

A 25 mL 3-necked flask which had been purged with argon flow was charged with acetonitrile (8 mL), acetonedicarboxylic acid (1.00 g, 6.84×10$^{-3}$ mol, 1.0 eq), 2,4-pentanediol (0.74 mL, 6.84×10$^{-3}$ mol, 1.0 eq), and scandium (III) trifluoromethanesulfonate (0.067 g, 1.37×10$^{-4}$ mol, 0.02 eq), and stirred at 40° C. for 2 hours. A vacuum pump was connected to the flask to thereby distill off acetonitrile. The resultant was stirred under a reduced pressure at 65° C. for 20 hours, and then purified by reprecipitating with methanol/water. The resultant polymer was subjected to a TG-DTA measurement to thereby confirm its decomposition temperature. The result is shown in FIG. 8.

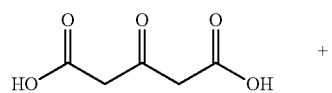

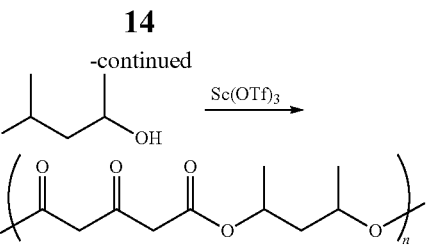

Comparative Example 5

Figure 9:
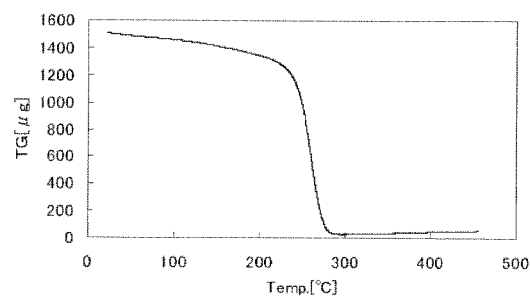
FIG. 9 shows a TG-DTA measurement result of a decomposable polymer of Comparative Example 5.

A 25 mL 3-necked flask which had been purged with argon flow was charged with acetonitrile (8 mL), hexafluoroglutaric acid (2.00 g, 8.33×10$^{-3}$ mol, 1.0 eq), 2,4-pentanediol (0.90 mL, 8.33×10$^{-3}$ mol, 1.0 eq), and scandium (III) trifluoromethanesulfonate (0.082 g, 1.67×10$^{-4}$ mol, 0.02 eq), and stirred at 40° C. for 2 hours. A vacuum pump was connected to the flask to thereby distill off acetonitrile. The resultant was stirred under a reduced pressure at 65° C. for 20 hours, and then purified by reprecipitating with methanol/water. The resultant polymer was subjected to a TG-DTA measurement to thereby confirm its decomposition temperature. The result is shown in FIG. 9.

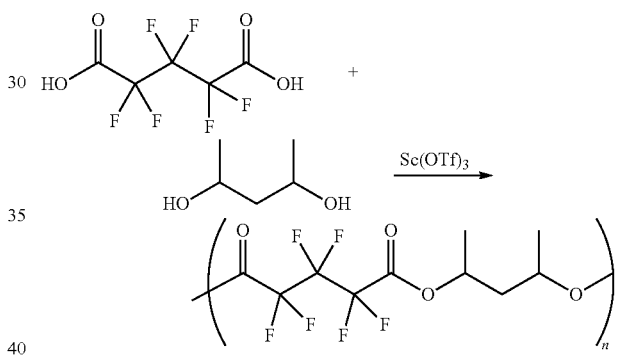

In TG-DTA measurement results of polymers of Examples 1 to 3 and Comparative Examples 1 to 5, a decomposition temperature was determined as a temperature at which a tangent to a line representing a weight before weight loss intersects a tangent to a line representing a weight loss due to decomposition. The results are shown in Table 1.

TABLE 1

|  | Degradation temperature (° C.) |
| --- | --- |
| Example 1 | 150 |
| Example 2 | 160 |
| Example 3 | 131 |
| Comparative Example 1 | 387 |
| Comparative Example 2 | 326 |
| Comparative Example 3 | 339 |
| Comparative Example 4 | 244 |
| Comparative Example 5 | 258 |

It can be seen that the decomposable polymers of the present invention have decomposition temperatures of 110° C. to 160° C., which are greatly lower than that of Comparative Examples 1 to 5.

It can be seen that decomposition temperatures of Comparative Examples 4 and 5 in each of which an electron-withdrawing group is introduced into an α- or β-position of carboxylic acid are about 100° C. lower than that of Comparative Examples 1, 2, and 3.

Figure 10:
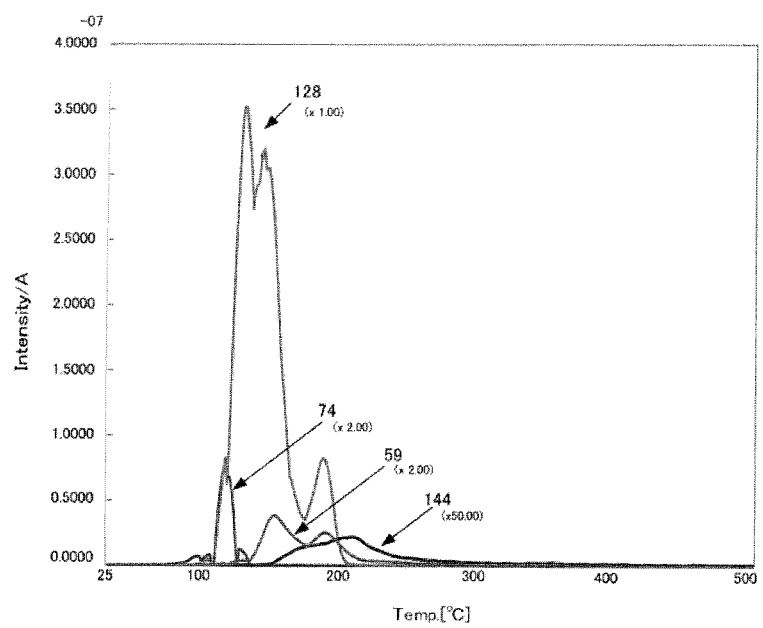
FIG. 10 shows a mass spectrum of a decomposable polymer of Example 3 during thermal decomposition.

FIG. 10 shows a mass spectrum of the decomposable polymer of Example 3 during thermal decomposition. In the above figure, a numeral 128 denotes naphthalene, a numeral 59 denotes acetone, and a numeral 144 denotes an isomer of acetone dicarboxylic acid. From the results, it can be confirmed that the decomposable polymer of Example 3 is decomposed into naphthalene and acetone dicarboxylic acid. Additionally, it can be confirmed that acetone dicarboxylic acid is decarboxylated to thereby produce acetone. Notably, acetone dicarboxylic acid is decomposed to thereby produce carbon dioxide, which is not detected.

The decomposable polymer of the present invention can be easily decomposed at a low temperature.

The decomposable polymer of the present invention hardly produces decomposed residues after decomposition because decomposed products are further decomposed.

Embodiments of the present invention are as follows:

<1> A decomposable polymer represented by the following is General Formula (1):

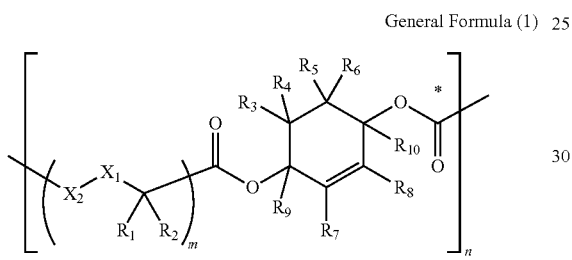

General Formula (1)

wherein $X_1$ denotes a group represented by the following General Formula (2); $X_2$ denotes a group represented by the following General Formula (3); $R_1$ and $R_2$ each independently denote a hydrogen atom, an alkyl group, an aromatic group, or an electron-withdrawing group; $R_3$ and $R_4$ each independently denote a hydrogen atom, an alkyl group, or an aromatic group, provide that $R_3$, $R_4$, or both thereof are a hydrogen atom; $R_5$ and $R_6$ each independently denote a hydrogen atom, an alkyl group, or an aromatic group, provide that $R_5$, $R_6$, or both thereof are a hydrogen atom; $R_7$ and $R_8$ each independently denote a hydrogen atom, a halogen atom, an alkyl group, or an aromatic group, provided that $R_7$ and $R_8$ may bond together to form a ring structure; $R_9$ and $R_{10}$ each independently denote a hydrogen atom, an alkyl group, or an aromatic group; n denotes a positive integer; and m denotes 0 or 1;

General Formula (2)

wherein $Y_1$ denotes an oxygen atom or a sulfur atom;

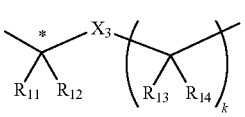

General Formula (3)

wherein $R_{11}$ and $R_{12}$ each independently denote a hydrogen atom, an alkyl group, an aromatic group, or an electron-withdrawing group; $R_{13}$ and $R_{14}$ each independently denote a hydrogen atom, an alkyl group, or an aromatic group; $X_3$ denotes a single bond or a group represented by the following General Formula (4); k denotes 0 or a positive integer, provided that when $X_3$ is the single bond, k is 0; and a carbon atom indicated by a symbol * binds to a carbon atom of a carbonyl group indicated by a symbol * in the General Formula (1);

General Formula (4)

wherein $Y_2$ denotes an oxygen atom or a sulfur atom.

<2> The decomposable polymer according to <1>, wherein, in the General Formula (1), the group represented by the General Formula (3) is a group represented by the following General Formula (5):

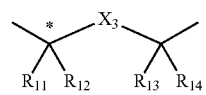

General Formula (5)

wherein $R_{11}$ and $R_{12}$ each independently denote a hydrogen atom, an alkyl group, an aromatic group, or an electron-withdrawing group; $R_{13}$ and $R_{14}$ each independently denote a hydrogen atom, an alkyl group, or an aromatic group; $X_3$ denotes a group represented by the following General Formula (6); and a carbon atom indicated by a symbol * binds to a carbon atom of a carbonyl group indicated by a symbol * in the General Formula (1);

General Formula (6)

wherein $Y_2$ denotes an oxygen atom or a sulfur atom.

<3> The decomposable polymer according to <1> or <2>, wherein the decomposable polymer is represented by the following General Formula (7):

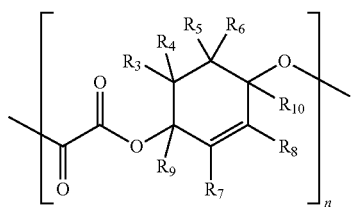

General Formula (7)

wherein $R_3$ and $R_4$ each independently denote a hydrogen atom, an alkyl group, or an aromatic group, provide that $R_3$, $R_4$, or both thereof are a hydrogen atom; $R_5$ and $R_6$, each independently denote a hydrogen atom, an alkyl group, or an aromatic group, provide that $R_5$, $R_6$, or both thereof are is a hydrogen atom; $R_7$ and $R_8$ each independently denote a hydrogen atom, a halogen atom, an alkyl group, or an aromatic group, provided that $R_7$ and $R_8$ may bond together to form a ring structure; $R_9$ and $R_{10}$ each independently denote a hydrogen atom, an alkyl group, or an aromatic group; and n denotes a positive integer.

<4> The decomposable polymer according to <1> or <2>, wherein the decomposable polymer is represented by the following General Formula (8):

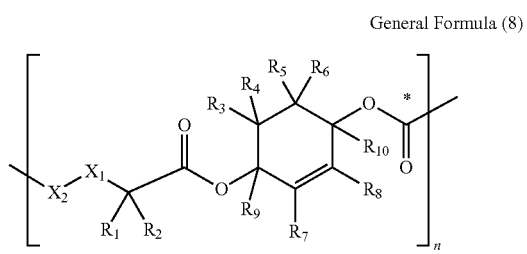

General Formula (8)

wherein $X_1$ denotes a group represented by the following General Formula (9); $X_2$ denotes a group represented by the following General Formula (10); $R_1$ and $R_2$ each independently denote a hydrogen atom, an alkyl group, an aromatic group, or an electron-withdrawing group; $R_3$ and $R_4$ each independently denote a hydrogen atom, an alkyl group, or an aromatic group, provide that $R_3$, $R_4$, or both thereof are a hydrogen atom; $R_5$ and $R_6$ each independently denote a hydrogen atom, an alkyl group, or an aromatic group, provide that $R_5$, $R_6$, or both thereof are a hydrogen atom; $R_7$ and $R_8$ each independently denote a hydrogen atom, a halogen atom, an alkyl group, or an aromatic group, provided that $R_7$ and $R_8$ may bond together to form a ring structure; $R_9$ and $R_{10}$ each independently denote a hydrogen atom, an alkyl group, or an aromatic group; and n denotes a positive integer;

General Formula (9)

wherein $Y_1$ denotes an oxygen atom or a sulfur atom;

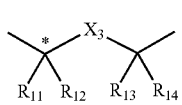

General Formula (10)

wherein $R_{11}$ and $R_{12}$ each independently denote a hydrogen atom, an alkyl group, an aromatic group, or an electron-withdrawing group; $R_{13}$ and $R_{14}$ each independently denote a hydrogen atom, an alkyl group, or an aromatic group; $X_3$ denotes a group represented by the following General Formula (11); and a carbon atom indicated by a symbol * binds to a carbon atom of a carbonyl group indicated by a symbol * in the General Formula (8);

General Formula (11)

wherein $Y_2$ denotes an oxygen atom or a sulfur atom.

<5> The decomposable polymer according to any one of <1>, <2>, or <4>, wherein $Y_1$ and $Y_2$ denote an oxygen atom.

<6> The decomposable polymer according to any one of <1> to <5>, wherein the decomposable polymer is decomposed into a dicarboxylic acid compound and a conjugated compound through application of heat energy.

<7> The decomposable polymer according to <6>, wherein the dicarboxylic acid compound is decarboxylated through application of heat energy.

This application claims priority to Japanese application No. 2013-001733, filed on Jan. 9, 2013, Japanese application No. 2013-047570, filed on Mar. 11, 2013 and Japanese application No. 2013-216410, filed on Oct. 17, 2013, and incorporated herein by reference.

What is claimed is:
1. A decomposable polymer represented by the following General Formula (1);

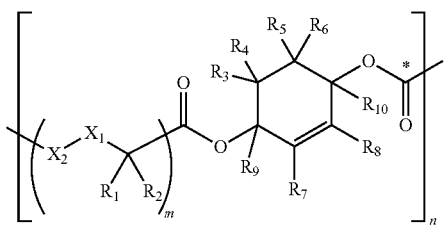

General Formula (1)

wherein $X_1$ denotes a group represented by the following General Formula (2); $X_2$ denotes a group represented by the following General Formula (3); $R_1$ and $R_2$ each independently denote a hydrogen atom, an alkyl group, an aromatic group, or an electron-withdrawing group; $R_3$ and $R_4$ each independently denote a hydrogen atom, an alkyl group, or an aromatic group, provide that $R_3$, $R_4$, or both thereof are a hydrogen atom; $R_5$ and $R_6$ each independently denote a hydrogen atom, an alkyl group, or an aromatic group, provide that $R_5$, $R_6$, or both thereof are a hydrogen atom; $R_7$ and $R_8$ each independently denote a hydrogen atom, a halogen atom, an alkyl group, or an aromatic group, provided that $R_7$ and $R_8$ may bond together to form a ring structure; $R_9$ and $R_{10}$ each independently denote a hydrogen atom, an alkyl group, or an aromatic group; n denotes a positive integer; and m denotes 0 or 1;

General Formula (2)

wherein $Y_1$ denotes an oxygen atom or a sulfur atom;

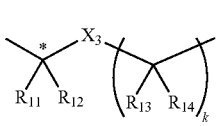

General Formula (3)

wherein $R_{11}$ and $R_{12}$ each independently denote a hydrogen atom, an alkyl group, an aromatic group, or an electron-withdrawing group; $R_{13}$ and $R_{14}$ each independently denote a hydrogen atom, an alkyl group, or an aromatic group; $X_3$ denotes a single bond or a group represented by the following General Formula (4); k denotes 0 or a positive integer, provided that when $X_3$ is the single bond, k is 0; and a carbon atom indicated by a symbol * binds to a carbon atom of a carbonyl group indicated by a symbol * in the General Formula (1);

General Formula (4)

wherein $Y_2$ denotes an oxygen atom or a sulfur atom.

2. The decomposable polymer according to claim 1, wherein, in the General Formula (1), the group represented by the General Formula (3) is a group represented by the following General Formula (5):

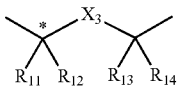

General Formula (5)

wherein $R_{11}$ and $R_{12}$ each independently denote a hydrogen atom, an alkyl group, an aromatic group, or an electron-withdrawing group; $R_{13}$ and $R_{14}$ each independently denote a hydrogen atom, an alkyl group, or an aromatic group; $X_3$ denotes a group represented by the following General Formula (6); and a carbon atom indicated by a symbol * binds to a carbon atom of a carbonyl group indicated by a symbol * in the General Formula (1);

General Formula (6)

wherein $Y_2$ denotes an oxygen atom or a sulfur atom.

3. The decomposable polymer according to claim 1, wherein the decomposable polymer is represented by the following General Formula (7):

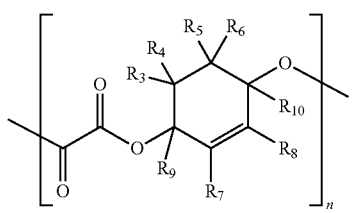

General Formula (7)

wherein $R_3$ and $R_4$ each independently denote a hydrogen atom, an alkyl group, or an aromatic group, provide that $R_3$, $R_4$, or both thereof are a hydrogen atom; $R_5$ and $R_6$ each independently denote a hydrogen atom, an alkyl group, or an aromatic group, provide that $R_5$, $R_6$, or both thereof are a hydrogen atom; $R_7$ and $R_8$ each independently denote a hydrogen atom, a halogen atom, an alkyl group, or an aromatic group, provided that $R_7$ and $R_8$ may bond together to form a ring structure; $R_9$ and $R_{10}$ each independently denote a hydrogen atom, an alkyl group, or an aromatic group; and n denotes a positive integer.

4. The decomposable polymer according to claim 1, wherein the decomposable polymer is represented by the following General Formula (8):

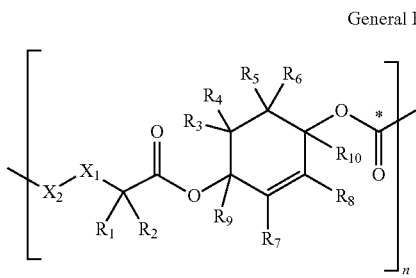

General Formula (8)

wherein $X_1$ denotes a group represented by the following General Formula (9); $X_2$ denotes a group represented by the following General ic Formula (10); $R_1$ and $R_2$ each independently denote a hydrogen atom, an alkyl group, an aromatic group, or an electron-withdrawing group; $R_3$ and $R_4$ each independently denote a hydrogen atom, an alkyl group, or an aromatic group, provide that $R_3$, $R_4$, or both thereof are a hydrogen atom; $R_5$ and $R_6$ each independently denote a hydrogen atom, an alkyl group, or an aromatic group, provide that $R_5$, $R_6$, or both thereof are a hydrogen atom; $R_7$ and $R_8$ each independently denote a hydrogen atom, a halogen atom, an alkyl group, or an aromatic group, provided that $R_7$ and $R_8$ may bond together to form a ring structure; $R_9$ and $R_{10}$ each independently denote a hydrogen atom, an alkyl group, or an aromatic group; and n denotes a positive integer;

General Formula (9)

wherein $Y_1$ denotes an oxygen atom or a sulfur atom;

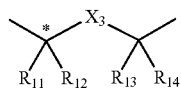

General Formula (10)

wherein $R_{11}$ and $R_{12}$ each independently denote a hydrogen atom, an alkyl group, an aromatic group, or an electron-withdrawing group; $R_{13}$ and $R_{14}$ each independently denote a hydrogen atom, an alkyl group, or an aromatic group; $X_3$ denotes a group represented by the following General Formula (11); and a carbon atom indicated by a symbol * binds to a carbon atom of a carbonyl group indicated by a symbol * in the General Formula (8);

General Formula (11)

wherein $Y_2$ denotes an oxygen atom or a sulfur atom.

5. The decomposable polymer according to claim 1, wherein $Y_1$ and $Y_2$ denote an oxygen atom.

6. The decomposable polymer according to claim 1, wherein the decomposable polymer is able to be decomposed a dicarboxylic acid compound and a conjugated compound through application of heat energy.

7. The decomposable polymer according to claim 6, wherein the dicarboxylic acid compound is able to be decarboxylated through application of heat energy.

* * * * *